(12) United States Patent
Kislitsin et al.

(10) Patent No.: US 11,122,061 B2
(45) Date of Patent: Sep. 14, 2021

(54) METHOD AND SERVER FOR DETERMINING MALICIOUS FILES IN NETWORK TRAFFIC

(71) Applicant: Group IB TDS, Ltd, Moscow (RU)

(72) Inventors: Nikita Igorevich Kislitsin, Moscow (RU); Nikolay Nikolaevich Andreev, Khimki (RU)

(73) Assignee: GROUP IB TDS, LTD, Moscow (RU)

(*) Notice: Subject to any disclaimer, the term of this patent is extended or adjusted under 35 U.S.C. 154(b) by 388 days.

(21) Appl. No.: 16/249,004

(22) Filed: Jan. 16, 2019

(65) Prior Publication Data
US 2019/0222591 A1   Jul. 18, 2019

(30) Foreign Application Priority Data
Jan. 17, 2018   (RU) .......................... RU2018101763

(51) Int. Cl.
H04L 29/06    (2006.01)
G06F 9/455    (2018.01)
G06F 21/56    (2013.01)

(52) U.S. Cl.
CPC ...... H04L 63/1416 (2013.01); G06F 9/45558 (2013.01); H04L 63/126 (2013.01);
(Continued)

(58) Field of Classification Search
None
See application file for complete search history.

(56) References Cited

U.S. PATENT DOCUMENTS 7,225,343 B1   5/2007   Honig et al.
7,383,581 B1   6/2008   Moore et al.
(Continued)

FOREIGN PATENT DOCUMENTS

AU   2017203008 B2   3/2019
CN     103491205 A   1/2014
(Continued)

OTHER PUBLICATIONS

Notice of Allowance with regard to the counterpart U.S. Appl. No. 15/858,013 dated May 8, 2020.
(Continued)

*Primary Examiner* — Joseph P Hirl
*Assistant Examiner* — Hassan Saadoun
(74) *Attorney, Agent, or Firm* — BCF LLP

(57) ABSTRACT

There is disclosed a method for determining malicious files in a network traffic, the method executable by a server. The method comprises: receiving the network traffic from a data communication network, retrieving a plurality of files from the network traffic, analyzing the plurality of files in order to detect at least one suspicious file, running the at least one suspicious file in at least one virtual machine, the at least one virtual machine associated with a set of the status parameters, determining changes in the set of the status parameters of the at least of one virtual machine, analyzing the changes in the set of status parameters using a set of the analysis rules such that to classify the at least one suspicious file as a malicious file based on the changes in the set of status parameters being indicative of the at least one file being the malicious file.

19 Claims, 2 Drawing Sheets

(52) U.S. Cl.
CPC ............. *G06F 2009/45587* (2013.01); *G06F 2009/45595* (2013.01)

(56) References Cited

U.S. PATENT DOCUMENTS

| | | | |
|---|---|---|---|
| 7,496,628 B2 | 2/2009 | Arnold et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1* | 3/2014 | Barker .................. H04L 63/145 726/24 |
| 8,776,229 B1* | 7/2014 | Aziz .................... H04L 63/145 726/23 |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1* | 5/2019 | Aziz .................... G06F 9/00 |
| 10,467,411 B1 | 11/2019 | Pidathala et al. |
| 2002/0161862 A1 | 10/2002 | Horvitz |
| 2003/0009696 A1 | 1/2003 | Bunker et al. |
| 2006/0021029 A1* | 1/2006 | Brickell ................. G06F 21/51 726/22 |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1* | 8/2013 | Aziz .................... H04L 63/145 726/24 |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0356291 A1* | 12/2015 | Zakorzhevsky ....... G06F 21/561 726/24 |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |

(56) References Cited

U.S. PATENT DOCUMENTS

| | | |
|---|---|---|
| 2018/0309787 A1 | 10/2018 | Evron et al. |
| 2019/0089737 A1 | 3/2019 | Shayevitz et al. |
| 2019/0207973 A1 | 7/2019 | Peng |
| 2019/0230098 A1 | 7/2019 | Navarro |
| 2019/0373005 A1 | 12/2019 | Bassett |
| 2020/0092306 A1 | 3/2020 | Jusko et al. |
| 2020/0134702 A1 | 4/2020 | Li |

FOREIGN PATENT DOCUMENTS

| | | |
|---|---|---|
| CN | 104504307 A | 4/2015 |
| CN | 103020494 B | 6/2015 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| RU | 2702269 C1 | 10/2019 |
| RU | 2706896 C1 | 11/2019 |
| WO | 3245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

Office Action with regard to the counterpart U.S. Appl. No. 15/858,013 dated Nov. 22, 2019.
Office Action received with regard to the counterpart U.S. Appl. No. 15/858,032 dated Apr. 6, 2020.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/270,341 dated May 27, 2020.
English Absliact of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abslract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—the Notice of Allowance with regard to the counterpart U.S. Appl. No. 15/707,641.
Notice of Allowance with regard to the counterpart U.S. Appl. No. 15/858,013 dated Jun. 10, 2020.
Office Action with regard to the counterpart U.S. Appl. No. 16/261,854 dated Oct. 21, 2019.
Office Action with regard to the counterpart U.S. Appl. No. 15/707,641 dated Apr. 25, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.

(56) References Cited

OTHER PUBLICATIONS

Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Grant Decision and Search Report with regard to the RU Patent Application No. 2019139630 completed Jun. 26, 2020.
Dauber et al., "Stylometric Authorship Attribution in Collaborative Documents", Materials of International Conference on Cyber Security Cryptography and Machine Learning (CSCML) 2017, pp. 115-135.
Afroz, Deception in Authorship Attribution, Drexel University, 2013, http://hdl.handle.net/1860/4431, pp. 1-91.
Granin, "Text Analyzer", https://habr.com/ru/post/114186/ and Machine Translation into English by Yandex Translate on Oct. 21, 2020, pdf 32 pages.
"Authorship Attribution Program by NeoNeuro", https://neoneuro.com accessed Jul. 31, 2020, pdf 5 pages.
"Tools for Software Analysis and Forensic Engineering, S.A.F.E.", https://www.safe-corp.com/index.htm accessed Jul. 31, 2020, pdf 2 pages.
English Abstract for CN 103020494 retrieved on Espacenet on Oct. 21, 2020.
Grant Decision and Search Report with regard to the RU Patent Application No. 2019139628 completed Jun. 26, 2020.
Search Report with regard to the RU Patent Application No. 2020126232 completed Jan. 28, 2021.
Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.

\* cited by examiner

METHOD AND SERVER FOR DETERMINING MALICIOUS FILES IN NETWORK TRAFFIC

CROSS-REFERENCE

The present application claims convention priority to Russian Utility Patent Application No. RU2018101763, filed on Jan. 17, 2018, entitled "METHOD AND SERVER FOR DETERMINING MALICIOUS FILES IN NETWORK TRAFFIC", the entirety of which is incorporated herein by reference.

TECHNICAL FIELD

The non-limiting embodiments of the present technology relate to the field of information security in computer systems and networks in general, and in particular to a server and a method for determining malicious files in network traffic.

BACKGROUND

At present, in view of continuous scientific-technical progress in the field of information technologies, issues of ensuring information security, in particular the issues of protection against targeted attacks of intruders, are becoming increasingly important.

Targeted attacks are attacks directed at a particular organization, group of companies, industry, etc., and implemented generally over a long period of time using significant resources of the attacker(s). When executing such targeted attacks, intruders often use malicious code developed or modified specifically to achieve their goals. In the prior art, the aforementioned attacks are also often referred to as targeted cyber-attacks or attacks of the type Advanced Persistent Threat (APT). The main features of such attacks of the APT type are the long-term nature of impact on the target and difficulty of detection of such attacks. The attacker is "implanted" into the compromised information system and acts as secretly as possible; thereby the attacker keeps control and access to confidential information for a long time. Initially, large government organizations, military and industrial infrastructure facilities, large banks were the goals of targeted attacks, but over time, a greater number of intruders had the opportunity to use "exploit" scripts and "zero-day" threats, significantly expanding the range of potential targets. Therefore it can be said that this type of cyber attacks has evolved into mass attacks using modified viruses to bypass standard signature-based methods of detection and blocking. Most targeted attacks use an algorithm are associated with somewhat similar sequence of actions taken by an attacker during preparing and executing his attack. In the state of art, such a sequence of the attacker actions is called a "Cyber-Kill Chain". Within this chain, there are seven stages of the attack. The first stage is reconnaissance. According to the first stage, the attacker collects data about a potential victim and analyzes possible ways of penetration into the information system, and the attacker often uses open data sources, such as social networks profile, company websites, lists, newsletters, etc., to collect the necessary information. The second stage is weaponization. According to the second stage, the attackers prepare a file with malicious content, usually having a widely used format, such as, for example, a PDF format or a Microsoft Office file format, for its further delivery to the victim. The third stage is delivery of the prepared malicious file. According to the third stage, the attackers deliver the malicious file to the victim via e-mail, a web resource or a data medium, such as a USB flash drive. The fourth stage is infection (exploitation) of a victim workstation. According to the fourth stage, the malicious code is run in the target victim workstation. The fifth stage is installation of the malicious program in the target victim workstation. The sixth stage is to execute command and control (C&C) over the infected workstation. According to the sixth stage, the attackers organize a hidden channel to control the infected workstation, as well as receive additional modules of malicious code and provide interaction with C&C servers. The seventh stage is the final one and consists in executing the actions on an object. According to the seventh stage, the attackers collect and steal confidential data, encrypt files, take control, replace data and perform other actions depending on the attack goals.

At present, the market of solutions to counteract and to detect the targeted attacks and complex types of APT attacks is still developing. The most common tools to protect against APT attacks are specialized software and hardware systems that operate at the network level and are based on analysis of anomalous network activity (Network Behavior & Anomaly Detection). These solutions usually collect network activity information via the SPAN and NetFlow protocols, build a reference model of network activity, and monitor for deviations that occur. The drawbacks of the solutions of this type include the inability to work in the blocking mode and the relatively high requirements for the operating personnel qualifications.

In addition, there are solutions of what is known as "Protection of Next-Generation/Advanced Endpoint" type. These solutions are not based on the signature detection methods, but rather on algorithms to track anomalous and/or dangerous activity in the user workstation. The exact principles of operation of these solutions may be different depending on the particular solution and its producer; specifically, the solutions may be based on the following mechanisms: machine learning, behavioral analysis, mechanisms of "containerization" and generation of a list of the permitted software (white listening), monitoring system processes and files.

The protection tools described above may be useful as "last resort", however, in view of their insufficient effectiveness; the tools clearly are not suitable to be used as the only tools of protection from the APT attacks.

At present, one of the most effective solutions from the commercially available tools and protective systems is the specialized hardware and software systems that are referred to "sandboxes" in the art. These protection tools make it possible to execute the automated statistical and dynamic analysis of the suspicious files in the virtual environment and, if necessary, to block the files, and that allows to safely estimate "behavior" and consequences of opening the suspicious file. The solutions of this class do not rely on the signature mechanisms of the destructive code detection, but rather upon an estimate of the actions the code executed, their safety and correctness in this program environment. The suspicious file is automatically analyzed in the virtual environment identical to the operating system execution environment (operating system version, application software, etc.) used in the user workstation. Unlike other known solutions to protect against targeted attacks, the "sandboxes" not only allow to detect traces of the targeted attack in the information system, but also allow the system to block this attack even at the stage of delivering the malicious code to the victim user. In addition, independence from signature detection methods allows the "sandboxes" to detect malicious code of the "zero day", specially designed or modified to execute the targeted attack.

One of the "sandbox" illustrative examples is described in U.S. Pat. No. 8,776,229 (published Jul. 8, 2014).

U.S. Pat. No. 8,776,229 discloses a system that is configured to detect malicious network traffic, containing an analyzing device to analyze the network traffic and the network device. The analyzing device of the system according to U.S. Pat. No. 8,776,229 is configured to analyze the network traffic received via the communication network and to create copies of network data packets from the received network traffic, and for the packets, using heuristic analysis for compliance with a heuristic threshold value, the system determines whether the packet characteristics are related with the malicious traffic. The network device in the system according to U.S. Pat. No. 8,776,229 contains a control unit that is in communication with one or more virtual machines configured to (i) receive copies of the network data packets from the analyzing device; (ii) monitor behavior of the first virtual machine from the specified virtual machines in response to processing the received copies of the data packets in this first virtual machine; (iii) identify abnormal behavior as an unexpected event in the monitored behavior; and (iv) determine, based on the identified abnormal behavior, the presence of malicious traffic in the copies of the network data packets.

It should be noted that implementation of the protection mechanisms described in U.S. Pat. No. 8,776,229 requires significant computational power, with the result that the implementation of these protection system at the level of end workstations or servers is often either impossible or inefficient.

SUMMARY

Thus, there is a need for further improvement of the systems and methods for protection against the targeted attacks, wherein the attackers use files of widely used formats with malicious content transmitted over the network, in particular, for effective distribution of computing resources that are spent on providing this automated protection.

Consequently, the technical problem solved by the non-limiting embodiments of the present technology is to create a system and method for detecting malicious files in network traffic such that the above-mentioned drawback of the known protection systems and methods (such as inefficient use of computing resources while providing automated protection) is at least partially eliminated.

As such, in accordance with a first broad aspect of the present technology, there is provided a server for determining malicious files in network traffic. The server comprises: a communication module configured to receive the network traffic from a data communication network, a filtering module configured to connect to the communication module to receive the network traffic from the communication module and to execute: retrieving a plurality of files from the network traffic, analyzing the plurality of files in order to detect at least one suspicious file, a system monitoring module configured to connect to the filtering module to receive the at least one suspicious file and to execute: running the at least one suspicious file in at least one virtual machine, the at least one virtual machine being associated with a set of the status parameters, determining changes in the set of the status parameters of the at least of one specified virtual machine, a processing module configured: to connect to the system monitoring module to receive the changes in the set of status parameters, and to analyze the changes in the set of status parameters using a set of the analysis rules such that to classify the at least one suspicious file as a malicious file based on the changes in the set of status parameters being indicative of the at least one file being the malicious file.

In some implementations of the server, the communication module is further configured to connect to at least one of the network traffic capturing devices that are part of the data communication network.

In some implementations of the server, in order to execute analyzing the plurality of files in order to detect at least one suspicious file, the filtering module is configured to check whether a format of a given one of the plurality of files is suspicious such that the given file is classified as one of (i) a trusted file if its format is not suspicious and (ii) as a suspicious file if its format is suspicious.

In some implementations of the server, when checking the format of the given one of the plurality of files, the filtering module is configured to execute: identifying the format of given one of the plurality of files, receiving an indication of known harmful file formats, determining a match of the format of given one of the plurality of files and each of the known harmful file formats.

In some implementations of the server, in response to identifying that the given one of the plurality of files is associated with a suspicious format, the filtering module is further configured to determine whether there is a behavioral report associated with the given one of the plurality of files.

In some implementations of the server, if the behavioral report exists, the filtering module is further configured to execute: receiving an indication of the behavioral report, generating a hash sum of the given one of the plurality of files, and wherein the determining the match comprises: comparing the hash sum of the given one of the plurality of files with hash sums that identify the behavioral reports.

In some implementations of the server, in response to detection of the behavioral report for the given one of the plurality of files, the filtering module is further configured to check whether the existing behavioral report is up-to-date such that the classification of the given one of the plurality of files is executed in response to the existing behavioral report being up-to-date.

In some implementations of the server, in response to the fact that the existing behavioral report is not up-to-date, the filtering module is further configured to check whether the given one of the plurality of files is signed with a trusted electronic signature such that the given one of the plurality of files is classified as the trusted file if it is signed with the trusted electronic signature.

In some implementations of the server, when checking whether the given one of the plurality of files sighed with the trusted electronic signature, the filtering module is configured to execute: identifying an electronic signature owner who signed the given one of the plurality of files, receiving an indication of trusted owners of the electronic signatures, determining a match of the electronic signature owner with the trusted owners of electronic signatures.

In some implementations of the server, in response to the fact that the given one of the plurality of files is not signed with the trusted electronic signature, the filtering module is further configured to check whether the given one of the plurality of files originates from a trusted data source such that the given one of the plurality of files is classified as the trusted file if it originated from the trusted data source.

In some implementations of the server, in order to check if the given one of the plurality of files originates from the trusted data source, the filtering module is configured to execute: determining a source of the given one of the plurality of files, receiving data indicative of trusted sources, determining a match of the source of the given one of the plurality of files with the trusted data sources.

In some implementations of the server, in response to the fact that the given one of the plurality of files does not originate from the trusted source, the filtering module is further configured to check whether a trusted file identifier has been assigned to the given one of the plurality of files such that the given one of the plurality of files is classified as the trusted file if it was assigned the trusted file identifier.

In some implementations of the server, in order to check whether the given one of the plurality of files has the trusted file identifier the filtering module is configured to execute: generating a hash sum of the given one of the plurality of files, receiving data representative of trusted files, each of the trusted file having a trusted file hash sum, determining a match of the hash sum with the hash sum of given one of the trusted files.

In some implementations of the server, in response to the fact that the given one of the plurality of files has no trusted file identifier, the filtering module is further configured to send the given one of the plurality of files to the system monitoring module.

In some implementations of the server, to run each of the at least one suspicious file in the virtual machine, the system monitoring module is further configured to execute: identifying at least one attribute of each of the at least one suspicious received file, receiving data representative of available virtual machines, wherein each of the available virtual machines is associated with a set of configuration attributes, determining a default virtual machine from the available virtual machines, based on at least one configuration attribute of the set of the configuration attributes matching with the at least one attribute of a given one the at least one suspicious file, starting the given one of the at least one suspicious file in the default virtual machine such that at least one additional attribute of the given one of the at least one suspicious file is identified; and determining a match of the at least one additional attribute with at least one additional configuration attributes of the default virtual machine, in response to a negative outcome of the match, restarting execution of the given one of the at least one suspicious file in yet another virtual machine from the existing virtual machines, wherein the configuration attributes of the other existing virtual machine match with the attributes of the given one of the at least one suspicious file.

In some implementations of the server, to determine changes in the set of the status parameters of at least one specified virtual machine, the system monitoring module is configured to trace the changes over a pre-predetermined time period of 2 to 3 minutes.

In some implementations of the server, the system monitoring module is further configured to change at least one of: the set of the status parameters of each virtual machine and the set of the analysis rules.

In some implementations of the server, in response to classifying the at least one suspicious file as the malicious file, the server monitoring system module is further configured to execute one of: issuing an alert message, blocking the malicious file, blocking a source associated with the malicious file, adding the malicious file into a malicious file database, generating a behavioral report for the malicious file.

In accordance with another broad aspect of the present technology, there is provided a method for determining malicious files in a network traffic. The method executable by a server. The method comprises: receiving the network traffic from a data communication network, retrieving a plurality of files from the network traffic, analyzing the plurality of files in order to detect at least one suspicious file, running the at least one suspicious file in at least one virtual machine, the at least one virtual machine being associated with a set of the status parameters, determining changes in the set of the status parameters of the at least of one specified virtual machine, analyzing the changes in the set of status parameters using a set of the analysis rules such that to classify the at least one suspicious file as a malicious file based on the changes in the set of status parameters being indicative of the at least one file being the malicious file.

In accordance with another broad aspect of the present technology, there is provided a computer-readable medium for long-term data storing that stores computer-readable instructions that, when executed by the server processor, cause execution of the methods described herein.

In the context of the present description, unless otherwise is specifically stated, at least some of the structure modules of the proposed server, such as, for example, the filtering module, the system monitoring module and the processing module, may be a computer program that is installed in a suitable computing hardware and capable to receive commands/statements/requests and/or data over the data communication network, ensuring execution of the received commands/statements/requests and/or processing of the received data (for example, the network traffic data), and/or initiate execution of the received commands/statements/requests, and/or initiate processing of the received data. The computing hardware may be one physical computer, one physical computer system, or any other suitable computing device known in the art, but neither of them is mandatory for this technical solution. In the context of this description, use of the expression "server" does not mean that each task (for example, received commands, statements or requests) or any particular task will be received, executed or initiated to be executed by the same server (i.e. the same software and/or hardware), but means that any number of software elements or hardware devices may be involved in receiving/transmitting, executing or initiating execution of any commands/statements/requests and/or consequence of these commands/statements/requests as well as data processing, and all this software and/or hardware may be a single server or several servers, and both these embodiments are included in the expression "at least one server".

In the context of the present description, unless otherwise is clearly specified, the term "module" means software (corresponding to a particular hardware context) that is necessary and sufficient to perform the specified function(s).

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION OF THE NON-LIMITING EMBODIMENTS

Figure 1:
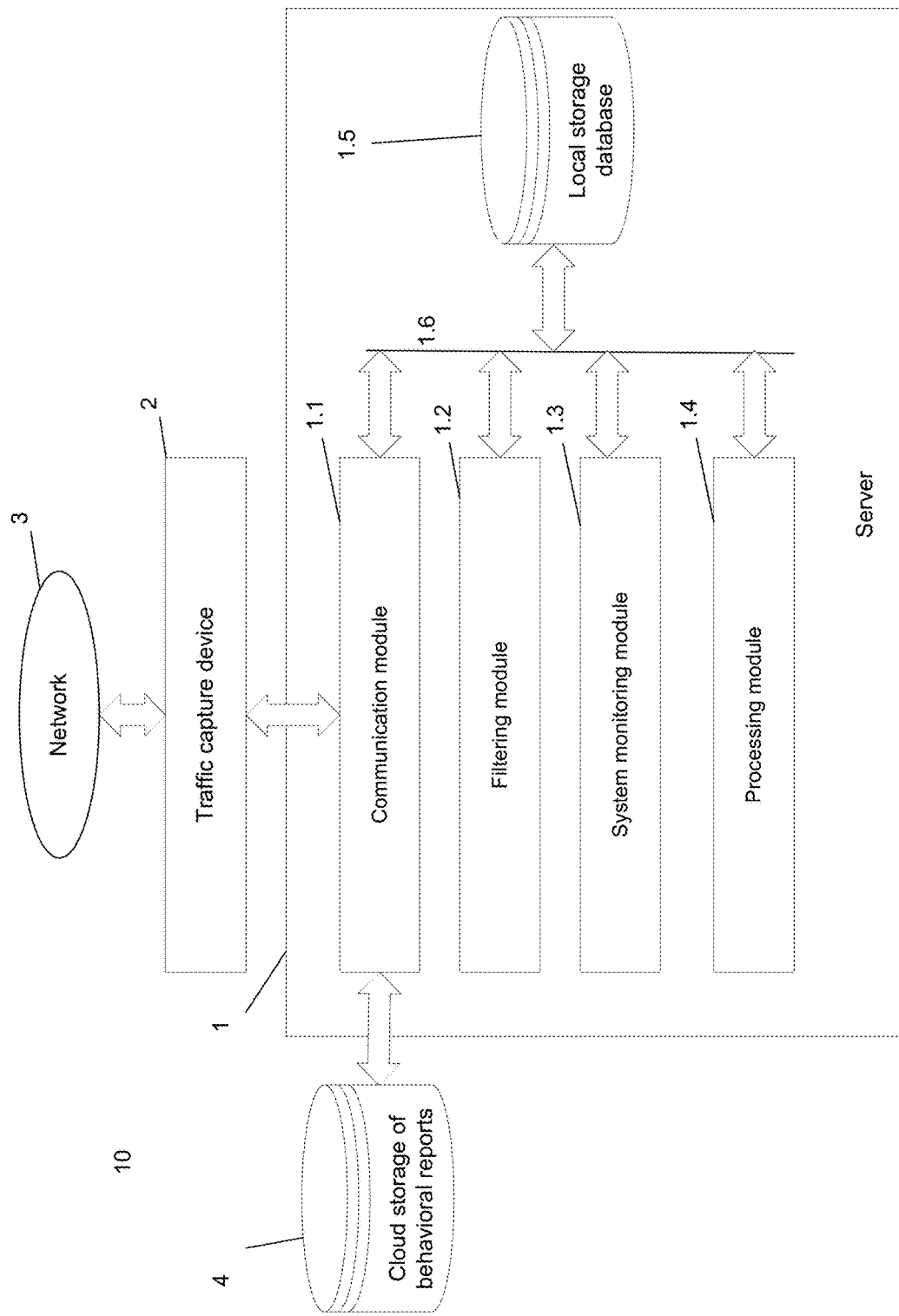
FIG. 1 depicts a block diagram of a system for detecting malicious files in network traffic according to some of the non-limiting embodiments of the present technology.

The following description is presented only to describe an example of the non-limiting embodiments of the present technology. This description is not intended to delimit the present technology or define its scope.

Some useful examples to modify the described method and the system that determines the harmful web resources may also be covered by the following description. Its purpose is also solely to help in understanding, but not to determine the scope and boundaries of this technical solution. These modifications are not an exhaustive list, and those skilled in the art will understand that other modifications are possible. In addition, it should not be interpreted so that if no modification examples have been provided then no modifications are possible and/or something described here is the only embodiment of this element of the present technical solution. As it will be clear to a person skilled in the art, this is most likely not the case. In addition, it should be keep in mind that, in some specific cases, the method and system to determine the malicious files in the network traffic are fairly simple embodiments of the present technical solution, and in such cases they are presented here in order to facilitate understanding. As it will be clear to a person skilled in the art, many embodiments of the present technical solution will be much more complex.

It should be noted that the main channels to receive malicious code, in particular various kinds of viruses, are files downloaded by users of workstations from various Internet resources or received because of interaction with untrusted Internet resources and as attachment files in e-mail messages. In particular, the files in the following common formats used to organize electronic document management in most organizations and companies all over the world are the most widespread among attackers to organize their attacks:

1) from the Microsoft Office package for various operating systems:
   b. Microsoft Excel software for working with spreadsheets: XLS, XLSX, XLT, XLM, XLTX, XLSM, XLTM, XLSB, XLA, XLAM, XLL, and XLW;
   c. Microsoft PowerPoint software for working with electronic presentations: PPT, PPTX, PPS, PPTM, POTX, POTM, PPAM, PPSX, PPSM, SLDX, and SLDM;
   d. Microsoft Word software for working with electronic text documents: DOC, DOCX, DOT, DOCM, DOTX, DOTM, including encryption (AES) of the malicious code (payload) of the macros in Microsoft Word documents;
   e. other Microsoft software and other office software packages from other companies, similar to Microsoft Office software;
2) other office applications: MSOLE2, MSWORD_MACS, MDB, ACCDB, MNY, NEW_OFFICE, HWP;
3) Archive files: TAR, ZIP, 7ZIP, RAR, Seven-Z, JAR and other similar formats, including those with password protection;
4) Adobe Acrobat software package from Adobe Systems for creating and viewing electronic publications: PDF;
5) Adobe Flash software package from Adobe Systems for creating multimedia presentations and web applications (multimedia files): SWF;
6) executable files: EXE, MSEXE, JARPACK, etc.;
7) general purpose files: RTF, CSV, SCR, JAR, etc.;
8) other less common file formats.

In addition, the attackers often use emails containing web links to malicious files in one of the above listed formats, including usage of short URLs (URL shortening), and also use various technologies to download malicious code in parts.

For virtual emulation of threats that the above files may constitute, in particular, infection of a workstation caused by exploits, "zero-day" attacks, targeted attacks, etc., the system 10 may be used to detect the malicious files in the network traffic shown in FIG. 1 that allows to detect suspicious files in the network traffic, in particular the files in the potentially dangerous format, and run them in virtual machines implementing technologies known in the art as a virtual "sandbox" to detect signs of potentially dangerous behavior.

System

With reference to FIG. 1, there is depicted a block diagram of a system 10, the system 10 being implemented in accordance with non-limiting embodiments of the present technology. System 10 is configured to detect malicious files in the network traffic. As depicted in FIG. 1, the system 10 comprises a server 1, a cloud storage 4 of behavioral reports that is connected to the server 1 for the purposes of data exchange, and devices 2 to capture traffic. The devices 2 are coupled to a data communication network 3 in order to extract the network traffic therefrom.

The server 1 is also connected to the data communication network 3 in order to exchange data with the traffic capturing devices 2 to receive therefrom the network traffic retrieved from the data communication network 3. The server 1 is configured to further process the received network traffic to identify malicious files that could infect the target workstation of a victim user when the workstation user opens these malicious files in the operating system of the target workstation with subsequent execution of a set of programmed malicious actions, such as theft of confidential data, file encryption, control interception, data substitution, etc. (depending on the attacker goals).

In the depicted non-limiting embodiment of the system 10 depicted in FIG. 1, the traffic capturing devices 2 are connected to the server 1 by a wire, for example, using a network cable. The traffic capturing devices 2 can be implemented as at least one of the following known network devices for intercepting and transmitting the network traffic: L2 network switches using network traffic mirroring technology for the required network segments, such as, for example, the network traffic mirroring SPAN technology in Cisco hardware, network transparency tools also referred to as Security Delivery Platforms or Network Packet Brokers (NPB), and Test Access Points of various types, as well as proxy servers with ICAP support working within the established TCP connection, mail servers with SMTP support, etc.

In one non-limiting embodiment of the present technology, the server 1 may be part of the data communication network 3 or can be otherwise coupled to the data communication network 3 in order to extract the network traffic for its further analysis and processing to identify malicious files. In other words, in the at least some embodiments, the server 1 may have the functionality of the traffic capturing devices 2 described above, and the server 1, if necessary, may use a secure data receive/transmit link to receive the network traffic retrieved from the data communication network 3.

In another embodiment of the present technology, the above-described devices 2 for capturing the network traffic may be embedded or otherwise integrated into the server 1.

In some embodiments of the present technology, the server 1 may be wirelessly connected to the traffic capturing devices 2.

Cloud Storage of Behavioral Reports

In the non-limiting embodiment of the system 10 depicted in FIG. 1, the behavioral reports cloud storage 4 is wirelessly connected to the server 1 and is configured to store behavioral reports, each of which contains information about the behavior of a particular malicious file that are collected by the system monitoring module 1.3. Such behavioral report can reflect changes in numerous parameters of the virtual machine reflecting its status, wherein each behavioral report available in the behavioral reports cloud storage 4 is associated with a hash sum of the file, for which the behavior report was created, so that the particular hash sum identifies the particular behavioral report.

Each behavioral report also contains an indication of the version of the system monitoring module 1.3 that was used to analyze the file, when the given behavioral report was generated, and a determination made by the processing module 1.4 that was based on information collected by the system monitoring module 1.3 (i.e. determination of whether the file is a trusted file or a malicious file).

The behavioral reports cloud storage 4 is also configured to store at least one new behavioral report and to update the at least one of the behavioral reports stored in the behavioral reports cloud storage 4 based on the new behavioral data associated to at least one behavioral report.

The behavioral report data in the behavioral reports cloud storage 4 that is used in the system 10, may be stored both by: (i) a single remote file server connected to the data communication network 3 or to a data communication network other than the data communication network 3, and (ii) several remote file servers distributed in the data communication network 3 or in a data communication network other than the data communication network 3. Irrespective of the location of the behavioral reports cloud storage 4, the server 1 is configured to communicate with the behavioral reports cloud storage 4, using, for example, at least one known switching device to access to the behavioral reports stored in the behavioral reports cloud storage 4.

In one of the embodiments of the present technology, the behavioral report storage 4 and the server 1 may be connected to the data communication network 3 in order to exchange data between these entities via the data communication network 3. If necessary, in this embodiment, the server 1 and the behavioral reports cloud storage 4 may use a secure link for receiving/transmitting data to organize data exchange between these entities via the data communication network 3.

In yet another of the embodiments of the present technology, the behavioral report storage 4 may be embedded or integrated into the server 1, thus representing a local storage of the behavioral reports.

In some embodiments of the present technology, the behavioral reports cloud storage 4 may be connected to the server 1 via a data communication network other than the data communication network 3, and, if necessary, a secure channel for receiving/transmitting data may be used to exchange data between the server 1 and the behavioral reports cloud storage 4.

In another embodiment of the present technology, the server 1 and the behavioral reports cloud storage 4 may be connected to different data communication networks that may be connected using special switching devices, such as network hubs, network routers, and other known switching devices.

In some embodiments of the present technology, the server 1 may be connected to the behavioral reports cloud storage 4 using a wire, for example, using a network cable of a known type.

Server

In the non-limiting embodiment of the system 10 depicted in FIG. 1, the server 1 is implemented as a hardware and software system comprising the communication module 1.1, the filtering module 1.2, the system monitoring module 1.3, the processing module 1.4 and the local data storage 1.5; all the modules and storage are connected to the communication bus 1.6.

The communication module 1.1, the filtering module 1.2, the system monitoring module 1.3, and the processing module 1.4 are configured to exchange data via the communication bus 1.6 with local data storage 1.5.

More specifically, the communication module 1.1 is configured to exchange data via the communication bus 1.6 with the filtering module 1.2 that in turn is configured to exchange data via the communication bus 1.6 with the system monitoring module 1.3 and to exchange data via the communication module 1.1 communicating with the filtering module 1.2 via the communication bus 1.6 with the above described behavioral reports cloud storage 4.

The system monitoring module 1.3 is connected via the communication bus 1.6 with the processing module 1.4 in order to exchange data therewith; the processing module 1.4 being in turn configured to exchange data via the communication module 1.1 connected to the processing module 1.4 via the communication bus 1.6 with the above described behavioral reports cloud storage 4.

Local Data Storage

The local data storage 1.5 is configured to store executable program instructions that can control operation of the communication module 1.1, the filtering module 1.2, the system monitoring module 1.3 and the processing module 1.4 as well as to store data used in the operation of the server 1. As an example, data representative of known malicious file formats, data in regard to the current version of the system monitoring module 1.3, characterized by a given set of analyzed parameters and a given set of executed checks, data in regard to known trusted electronic signature owners and the data in regard of trusted files that are provided with a label or identifier of the trusted file and each of the trusted files is mapped to the specific file hash sum.

In addition, the local data storage 1.5 may store files of virtual machine images and each image can be characterized by a separate set of configuration attributes (that is, it has a separate configuration).

In some embodiments of the present technology, the available behavioral reports may be stored in the local data storage 1.5. In other embodiments of the present technology, the available behavioral reports may be stored in a separate local repository of behavioral reports (not shown) that may be connected via the communication bus 1.6 to the filtering module 1.2 allowing the filtering module 1.2 to access the storage of the behavioral reports to access the available behavioral reports, as well as with the processing module 1.4, enabling the processing module 1.4 to access to the behavioral report storage to update the behavioral reports stored in the storage or to write a new behavioral report into the storage.

In one embodiment of the present technology, the server 1 may contain a separate local storage of malicious file formats (not shown) configured to store the data on the malicious file formats. This storage of the malicious file formats may be connected via the communication bus 1.6 to the filtering module 1.2, enabling the filtering module 1.2 to access this storage of the malicious file formats in order to retrieve an indication of the known malicious file formats for later use to detect suspicious files (potentially dangerous) files in the network traffic received from the communication module 1.1, as described below in more detail.

In yet another embodiment of the present technology, a separate remote storage of malicious file formats (not shown) may be used to store the indication of the malicious file formats. In these embodiments, the filtering module 1.2 may be configured to connect, via the communication module 1.1 connected with the filtering module 1.2 via the communication bus 1.6, to this remote storage of the malicious file formats to obtain an indication of the known malicious file formats for their subsequent usage to detect suspicious (potentially dangerous) files in the network traffic received from the communication module 1.1, as described below in more detail.

In one embodiment of the present technology, the server 1 may comprise a separate local storage (not shown) for storing an indication of the current version (for example, the configuration serial number) of the system monitoring module 1.3, indication of the specific set of the analyzed parameters used in the current version, and the indication of the specific set of the checks used in the current version.

The local storage may be connected via the communication bus 1.6 to the filtering module 1.2 to enable the filtering module 1.2 to access the local storage to retrieve the indication of the current version of the system monitoring module 1.3 for later use to check actuality of the corresponding behavioral reports stored in the behavioral reports cloud storage 4.

In addition, the local storage may be connected to the system monitoring module 1.3, to enable the system monitoring module 1.3 to access the local storage to update the current version of the system monitoring module 1.3 or to record new data representative of the current version of the system monitoring module 1.3 when the set of analyzed parameters and/or the set of the checks used in the system monitoring module 1.3 has changed.

In yet another embodiment of the present technology, a separate remote storage may be used. The separate remote storage can be configured to store the indication of the current version of the system monitoring module 1.3, the indication of the specific set of the analyzed parameters used in the current version, and the indication of the specific set of the checks used in the current version.

The filtering module 1.2 may be configured to connect via the communication module 1.1 connected with the filtering module 1.2 via the communication bus 1.6 to the remote storage to receive indication of the current version of the system monitoring module 1.3 for later usage to check actuality of the relevant behavioral reports stored in the behavioral reports cloud storage 4. The system monitoring module 1.3 may also be configured to connect via the communication module 1.1 connected with the system monitoring module 1.3 via the communication bus 1.6 to the remote storage to update the data stored indicative of the current version of the system monitoring module 1.3 or to record new data representative of the current version of the system monitoring module 1.3 when the set of analyzed parameters and/or the set of the checks used in the system monitoring module 1.3 have changed.

In one embodiment of the present technology, the server 1 may comprise a separate local storage (not shown) of the electronic signature trusted owners, the separate local storage being configured to store data in regard to the known electronic signature trusted owners. The local storage of the electronic signature trusted owners may be connected via the communication bus 1.6 to the filtering module 1.2, enabling the filtering module 1.2 to access the local storage to retrieve therefrom the data representative of the known electronic signature trusted owners for later use to check whether the file being analyzed in the filtering module 1.2 is signed with a trusted electronic signature, as described below in more detail.

In yet another embodiment of the present technology, a separate remote storage (not shown) of the electronic signature trusted owners is configured to store data representative of the known electronic signature trusted owners may be used. The filtering module 1.2 may be configured to connect via the communication module 1.1 connected to the filtering module 1.2 via the communication bus 1.6 to the remote storage of the electronic signature trusted owners to retrieve therefrom the data representative of the known electronic signature trusted owners for later use to check whether the file being analyzed in the filtering module 1.2 is signed with a trusted electronic signature, as described below in more detail.

In one embodiment of the present technology, the server 1 may comprise a separate local storage (not shown) of the trusted data sources configured to store data representative of the known trusted sources. The local storage of the trusted sources may be connected via the communication bus 1.6 to the filtering module 1.2, enabling the filtering module 1.2 to access the local storage to retrieve therefrom the data representative of the known trusted sources for later use to check whether the file being analyzed in the filtering module 1.2 is originated from a trusted data source, as described below in more detail.

In one embodiment of the present technology, a separate remote storage (not shown) of the trusted data sources is configured to store data about the known trusted sources. The filtering module 1.2 may be configured to connect via the communication module 1.1 connected to the filtering module 1.2 via the communication bus 1.6 to the remote storage of the trusted data sources to retrieve therefrom the data representative of the known trusted data sources for later use to check whether the file being analyzed in the filtering module 1.2 is originated from a trusted data source, as described below in more detail.

In one embodiment of the present technology, the server 1 may comprise a separate local storage (not shown) of the trusted files designed to store data representative of the trusted files. The local storage of the trusted files may be connected via the communication bus 1.6 to the filtering module 1.2, enabling the filtering module 1.2 to access the trusted file local storage to receive therefrom the data representative the trusted files for later use to check whether the trusted file identifier had been assigned to the analyzed file, as well as to write to the trusted file local storage the data representative of a new trusted file mapped to its hash sum if the filtering module 1.2 classified the analyzed file as a trusted file as a result of the implementation of one of its functionalities described below.

In yet another embodiment of the present technology, a separate remote storage (not shown) of the trusted files configured to store data about the trusted files may be used. The filtering module 1.2 may be configured to connect via the communication module 1.1 connected to the filtering module 1.2 via the communication bus 1.6 to the remote storage of the trusted files to retrieve therefrom the data representative the trusted files for later use to check whether the trusted file identifier has been assigned to the analyzed file as well as to write to the remote storage of the trusted files the data representative of a new trusted file mapped to its hash sum if the filtering module 1.2 classified the analyzed file as a trusted file as a result of implementation of one of its functionalities described below.

In one embodiment of the present technology, the server 1 may comprise a separate local storage (not shown) of the virtual machine images to store the virtual machine image files. The local storage of the virtual machine images may be connected via the communication bus 1.6 to the filtering module 1.2, allowing the filtering module 1.2 to access the local storage of virtual machine images to retrieve therefrom the virtual machine image files for later use to analyze activity of the suspicious files.

In yet another embodiment of the present technology, a separate remote storage (not shown) of the virtual machine images configured to store the virtual machine image files may be used. The filtering module 1.2 may be configured to connect via the communication module 1.1 connected to the filtering module 1.2 via the communication bus 1.6 to the remote storage of the virtual machine images to retrieve therefrom the virtual machine image files for later use to analyze activity of the suspicious files.

The filtering module 1.2, the system monitoring module 1.3 and the processing module 1.4 may be implemented as a single processor, such as a general-purpose processor or a special-purpose processor (for example, processors for digital signal processing, specialized integrated circuits, etc.). Thus, the processor that implements the filtering module 1.2, the system monitoring module 1.3 and the processing module 1.4 in the server 1 may be configured to execute software instructions stored in the local data storage 1.5 for execution of the functionality of the filtering module 1.2 to detect suspicious files in the received network traffic, functionality of the system monitoring module 1.3 to create a log file for the specific suspicious file behavior in the operation system and functionality of the processing module 1.4 to render a final determination on the harmfulness of the suspicious file using the created log file.

In one embodiment of the present technology, each of the following modules: the filtering module 1.2, the system monitoring module 1.3 and the processing module 1.4, may be implemented as at least one separate processor. In a non-limiting embodiment, the first processor used in the server 1 to implement the filtering module 1.2 may be configured to execute software instructions stored in the local data storage 1.5 and to execute the filtering module 1.2 functionality to detect the suspicious files in the received network traffic. A second processor that implements the system monitoring module 1.3 may be configured to execute software instructions stored in the local data 1.5 storage to implement the system monitoring module 1.3 functionality to create a log file for a given suspicious file behavior in the specific format in the operating system of the specific assembly. A third processor used in server 1 to implement the processing module 1.4 may be configured to execute software instructions stored in the local data storage 1.5, such as to implement the functionality of the processing module 1.4 to render a final determination in regard to the suspicious file harmfulness using the created log file.

The local data storage 1.5 may be implemented, for example, in a form of one or more computer-readable media for long-term data storage. In some embodiments of the present technology, the local data storage 1.5 may be implemented using a single physical device (for example, one optical storage device, magnetic storage device, organic storage device or another type of storage devices, or disk storage device), and in other embodiments, the local data storage 1.5 may be implemented using two or more physical devices.

Communication Module

In the depicted embodiment of the server 1 of the system 10 depicted in FIG. 1, the communication module 1.1 is wired, for example, using a coaxial cable, twisted pair, fiber optic cable or other physical connection, to the traffic capturing devices 2 configured to receive the network traffic therefrom. Thus, the communication module 1.1 is configured to connect to one or more of the above described traffic capturing devices 2 that form part of the data communication network 3 and to receive the network traffic retrieved by the traffic capturing devices 2 from the data communication network 3.

In yet another embodiment of the present technology, the communication module 1.1 may be wirelessly connected to the traffic capturing devices 2, for example, using a communication line based on Wi-Fi technology, a communication line based on 3G technology, a communication line based on LTE technology, etc.

In addition, in the server 1 of the system 10, the communication module 1.1 is also wirelessly connected to the above described behavioral reports cloud storage, for example using a communication line based on Wi-Fi technology, a communication line based on 3G technology, a communication line based on LTE technology and/or a communication line based on other well-known wireless communication technology.

According to the non-limiting embodiments of the present technology, the communication module 1.1 in the server 1 may be implemented as a combination of a first network adapter, implemented with the required connectors to connect the physical cables of the necessary types depending on the types of the physical connections used to communicate with the traffic capturing devices 2, and a second network adapter implemented in the form of a Wi-Fi adapter, 3G adapter, LTE adapter, or other wireless adapter, depending on the type of a wireless line used to communicate with the behavioral reports cloud storage 4.

Thus, the communication module 1.1 in the server 1 may in fact be configured to receive input data from one or more devices in a wired and/or wireless way as well as to send or output data to other devices in a wired and/or wireless way.

The communication module 1.1 may also be a known communication device, such as a transmitter, receiver, transceiver, modem and/or network interface card for exchanging data with external devices of any type via a wired or wireless communication network, for example, using an Ethernet network connection, digital subscriber line (DSL), telephone line, coaxial cable, cellular telephone system, etc.

In some embodiments of the present technology, network traffic data packets received by the communication module 1.1 may be at least temporarily stored in the local data storage 1.5.

In other embodiments of the present technology, the network traffic data packets received by the communication module 1.1 may be at least temporarily stored in a separate network traffic data storage (not shown) that is different from the local data storage 1.5 and connected to the communication bus 1.6.

Filter Module

In the depicted embodiment of the server 1 of the system 10 depicted in FIG. 1, the filtering module 1.2 is configured to connect via the communication bus 1.6 with the communication module 1.1 to enable the filtering module 1.2 to receive the network traffic captured by the communication module 1.1. The filtering module 1.2 extracts a plurality of files from the received network traffic. The filtering module 1.s can support, for example, application file transfer protocols, such as HTTP, FTP, SMTP, etc. The filtering module 1.2 is configured to analyze each of the plurality of the retrieved files to detect at least one suspicious file.

In one embodiment of the present technology, the received network traffic is stored in the local data storage 1.5, and the filtering module 1.2 may be configured to access the local data storage 1.5 to retrieve from the storage 1.5 the stored data packets of the network traffic being analyzed for later packet analysis to identify at least one suspicious file, as described above.

In one embodiment of the present technology, the received network traffic is stored in a separate network traffic local storage (not shown), and the filtering module 1.2 may be configured to access the storage using the communication bus 1.6 to retrieve the stored data packets of the network traffic being analyzed for later packet analysis to identify at least one suspicious file, as described above.

When analyzing a given file retrieved from the received network flow, the filtering module 1.2 checks whether the format of the file being analyzed is suspicious (potentially harmful), ensuring that the given file being analyzed is classified as a trusted file if the file format is not suspicious or as a suspicious file if the file format is suspicious, and in the case of classifying the analyzed file as a trusted file, the file is assigned a label or identifier of a trusted file.

When the format of the given analyzed file is checked for suspicion, the filtering module 1.2 executes at least the following operations: (i) identifies the format of the file being analyzed, (ii) accesses the local data storage 1.5 or communicates with the storage 1.5 via the communication bus 1.6 in order to retrieve indication of known malicious file formats, and (iii) comparing the identified format of the given file being analyzed with the known malicious file formats. Thus, the filtering module 1.2 classifies the file being analyzed as a trusted file if the file format does not match to any known malicious formats or as a suspicious file if the file format matches to one of the known malicious formats, and if the analysis results show that the file is a file of the suspicious format then the file is assigned a label or identifier of a suspicious file.

Further, in response to the fact that the format of the file being analyzed is suspicious, the filtering module 1.2 is further configured to determine whether there is a behavioral report for the file being analyzed with the suspicious format.

To detect presence of a behavioral report, the filtering module 1.2 executes at least the following operations: (i) accesses the behavioral reports cloud storage 4 or communicates with the storage via the communication module 1.1 connected with the filtering module 1.2 via the communication bus 1.6 for retrieval of the available behavioral reports, (ii) calculates the hash sum of the analyzed file using, for example, one of the most well-known algorithms: SHA-1, MD5, CRC, etc., and (iii) matches each analyzed file to one of the available behavioral reports. Step (iii) can be executed by comparing the file with the received data about the behavioral reports using the hash sum. Thus, the filtering module 1.2 compares the calculated hash sum of the file being analyzed with the hash sums that identify the behavioral reports. A match of the hash sum for the file being analyzed with the hash sum identifying one of the exist behavioral reports means that the behavioral report for the file being analyzed has been already stored in the behavioral reports cloud storage 4.

Further, in response to the fact that the behavioral report exists for the file being analyzed, the filtering module 1.2 is further configured to check whether the existing behavioral report is up-to-date, such that the file being analyzed is classified as a trusted file or a malicious file if it is recognized as such file in the up-to-date behavioral report. To check whether the existing behavioral report is up-to-date, the filtering module 1.2 (i) identifies the version of the system monitoring module 1.3 used in the server 1 at the time this behavioral report was created, (ii) accesses the local data storage 1.5 via the communication bus 1.6 for receiving an indication of the current version of the system monitoring module 1.3 used in the server 1, and (iii) checks whether the current version of the system monitoring module 1.3 matches the version of the system monitoring module 1.3 in the received data, so that, if the versions of the system monitoring module 1.3 are the same the filtering module 1.2 considers the behavioral report available for the file being analyzed to be up-to-date, and if the versions of the system monitoring module 1.3 are not the same the filtering module 1.2 classifies the behavioral report available for the file being analyzed as an outdated report.

In response to the fact that the existing behavioral report is up-to-date, the filtering module 1.2 extracts from the behavioral report the hash sum of the file being analyzed that was generated by the processing module 1.4 based on information collected by the system monitoring module 1.3. If, for the file with the hash sum that matches the hash sum of the file being analyzed, and the determination was made that the file is a trusted file, the filtering module 1.2 classifies the file being analyzed to as a trusted file. On the other hand, if, for the file with the hash sum that matches the hash sum of the file being analyzed, a determination was made that the file is a malicious file, the filtering module 1.2 classifies the file being analyzed as a malicious file.

In response to the fact that the existing behavioral report is not up-to-date, the filtering module 1.2 checks whether the file being analyzed is signed with a trusted electronic signature such that to enable classification as a trusted file if it is signed with the trusted electronic signature.

To check that the file being analyzed has a trusted digital signature, the filtering module 1.2 (i) identifies the owner of the electronic signature that was used to sign the retrieved file, (ii) accesses the local data storage 1.5 for retrieval of the data representative of the known trusted owners of electronic signatures, (iii) determinates a match between the identified owner of the electronic signature with one of the trusted owners of electronic signatures. If the owners of the electronic signature are the same, the filtering module 1.2 determines that the file being analyzed is signed with the trusted electronic signature and then the file being analyzed is classified as a trusted file and, as a result, the file being analyzed is assigned a label or identifier of a trusted file.

In response to the fact that the file being analyzed is not signed with a trusted electronic signature, the filtering module 1.2 additionally checks whether the file being analyzed is originated from a trusted data source (for example, domain for a HTTP request), ensuring that the file being analyzed is classified as a trusted file if the file originates from the trusted data source.

To check the origin of the file being analyzed, the filtering module 1.2 (i) determines the retrieved file source, (ii) accesses to the local data storage 1.5 to retrieve indication of the known trusted sources, (iii) determines a match between the given source of origin of the file being analyzed with one of the known trusted data sources. If the data sources are the same, the filtering module 1.2 determines that the file being analyzed originates from the trusted data source and then classifies the file being analyzed as a trusted file, and, as a result, the file being analyzed is assigned a label or identifier of a trusted file.

It should also be noted that for the file being analyzed with the trusted file identifier that may be assigned to the file by the filtering module 1.2 in the above cases, the filtering module 1.2 calculates the hash sum of the file being analyzed using, for example, one of the most well-known algorithms: SHA-1, MD5, CRC, etc., and accesses to the local data storage 1.5 to store data representative of a new trusted file, mapped to the calculated hash sum of the trusted file.

In response to the fact that the file being analyzed does not originate from the trusted data source, the filtering module 1.2 further checks whether the file being analyzed has a trusted file identifier for classifying the file being checked as a trusted file if the file has been assigned the trusted file identifier or sending the file being analyzed via the communication bus 1.6 to the system monitoring module 1.3 for its further processing, as will be described below in more detail.

To check whether the trusted file identifier has been assigned to the file being analyzed, the filtering module 1.2 (i) calculates the hash sum of the file being analyzed using, for example, one of the most well-known algorithms: SHA-1, MD5, CRC, etc., (ii) accesses the local data storage 1.5 for retrieval of the data in regard to the trusted files (each trusted file mapped to a specific hash sum), (iii) determines a match between the calculated hash sum of the file being analyzed with the hash sum of any one of the trusted files. If the file hash sums are the same, the filtering module 1.2 determines that the file being analyzed originates from the trusted data source and then classifies the analyzed file as a trusted file.

Thus, according to the above description of functionality of the filtering module 1.2, the filtering module 1.2 is configured to filter at least a part of the files retrieved from the received network traffic using the minimum computing resources of the server 1 that in turn significantly speeds up the process of detecting malicious files in the network traffic.

System Monitoring Module

In the non-limiting embodiment of the server 1 of the system 10 depicted in FIG. 1, the system monitoring module 1.3 is configured to connect to the filtering module 1.2 such that the system monitoring module 1.3 may receive from the filtering module 1.2 the suspicious (potentially malicious) files detected by the filtering module 1.2 as described above. It should be noted that each file from the suspicious files received by the system monitoring module 1.3 is characterized by the set of attributes such as bit capacity (32 bit or 64 bit) and language (for example, Russian (rus) or English (eng)).

After receiving the suspicious files from the filtering module 1.2, the system monitoring module 1.3 identifies at least one attribute of each received suspicious file and then accesses the local data storage 1.5 for receiving the virtual machine image files from the storage 1.5, while the virtual machine in each virtual machine image file is characterized by a separate set of configuration attributes (that is, it has a separate assembly) and characterized by the set of status parameters, and at least one of the virtual machines in the received virtual machine image files has been preassigned with an identifier or with a tag of the default virtual machine (that is, the virtual machine used default by the system monitoring module 1.3).

It should be noted that the set of configuration attributes defined for each of the virtual machines may contain, for example, a specific combination of the following configuration attributes: operating system, language, and bit capacity.

Further, the system monitoring module 1.3 detects in the virtual machines contained in the received virtual machine image files a default virtual machine, wherein at least one of the configuration attributes from the separate set of the configuration attributes of the default virtual machine matches at least one identified attribute of the suspicious file. The system monitoring module 1.2 then starts the suspicious file in the identified default virtual machine.

After starting the suspicious file in the determined default virtual machine, the system monitoring module 1.3 is further configured to identify at least one additional attribute of the started file and to determine a match of yet one additional attribute with at least one additional configuration attribute of the default virtual machine from the separate set of the configuration attributes of the default virtual machine. Thus, the system monitoring module 1.3 determines whether the default virtual machine, when the particular suspicious file is started, is suitable to analyze the behavior of the particular suspicious file. If the default virtual machine is suitable to analyze the particular suspicious file, that is, when at least one additional attribute identified in the suspicious file running in the default virtual machine matches at least one additional configuration attribute of the default virtual machine, the system monitoring module 1.3 continues the analysis of the suspicious file for a time period, usually 2-3 minutes (that is, the analysis of the suspicious file in the default virtual the machine is not interrupted prematurely), followed by the default virtual machine shutdown after the time period.

In the case when the default virtual machine is not suitable to analyze the specific suspicious file, that is, when at least one additional attribute identified in the suspicious file running in the default virtual machine does not match at least one additional configuration attribute of the default virtual machine, the system monitoring module 1.3 stops the default virtual machine operation before expiration of the time period of the default virtual machine operation and re-starts this suspicious file in another virtual machine from the virtual machines existing in the received virtual machine image files. The new virtual machine is different from the default virtual machine and its configuration attributes match to the suspicious file attributes, that is, the virtual machine is a virtual machine that has at least one configuration attribute that matches at least one suspicious file attribute, as described above with respect to the default virtual machine, and, in addition, at least one additional configuration attribute matches with another suspicious file attribute.

For example, a virtual machine with the following set of the configuration attributes may be used as the default virtual machine from virtual machines existing in the received virtual machine image files to run 32-bit suspicious files: the operating system is Windows XP, the architecture is x86 (32-bit), the language is Russian (rus). A virtual machine with the following set of the configuration attributes may be used, for example, as the default virtual machine from virtual machines existing in the received virtual machine image files to run 64-bit suspicious files: the operating system is Windows 7, the architecture is x64 (64-bit), and the language is English (eng).

In particular, in accordance with the non-limiting embodiments of the present technology, the system monitoring module 1.3 first starts each received suspicious file in the default virtual machine that has the bit capacity matching with the suspicious file bit capacity. The system monitoring module 1.3 then determines whether the language of the suspicious file started in the default virtual machine and the default virtual machine language are the same. In the case of a mismatch of the compared languages, the system monitoring module 1.3 prematurely stops the default virtual machine and restarts the suspicious file in another virtual machine that differs from the default virtual machine and has a bit capacity and a language that match to the suspicious file language.

Thus, as described above, the system monitoring module 1.3 runs each received suspicious file in at least one virtual machine that is suitable to analyze the suspicious file. Starting the suspicious file in the suitable virtual machine, the system monitoring module 1.3 detects and records changes in the set of the status parameters of the suitable virtual machine during the time period, such that a report and/or log file are generated. Such report or the log file contain an indication of all changes that are registered by the system monitoring module 1.3 in the set of the status parameters for the time period and reflecting the analyzed suspicious file activity in the virtual machine.

In one embodiment of the present technology, a log file with the indication of changes of the virtual machine status parameters that is generated by the system monitoring module 1.3 for each suspicious file analyzed in the virtual machine may be stored in the local data storage 1.5 connected with the system monitoring module 1.3 via the communication bus 1.6, for subsequent use of the log file by the processing module 1.4 connected to the local data storage 1.5 via the communication bus 1.6.

In yet another embodiment of the present technology, the generated log file may be stored in a separate local report storage (not shown), that is different from the local data storage 1.5. The local report storage may be connected via the communication bus 1.6 to the filtering module 1.2, enabling the filtering module 1.2 to access the local report storage to store the generated log file for later use in the processing module 1.4 connected with the local data storage 1.5 via the communication bus 1.6.

In another embodiment of the present technology, the generated log file may be stored in a separate remote report storage (not shown) in the server 1. The remote report storage may be connected to the filtering module 1.2 via the communication module 1.1, enabling the filtering module 1.2 to access the remote report storage to store the generated log file for subsequent use by the processing module 1.4.

The system monitoring module 1.3 is configured to execute a framework (software platform) that allows, for example, an operator of the server 1 to change the set of analysis rules used by the system monitoring module 1.3 to detect and record changes in the set of the status parameters of a running virtual machine. As an example, to set or add new analysis rules (to identify new behavior markers) that are to be used later in the system monitoring module 1.3 operation. Change of the rule set used in the system monitoring module 1.3 operation can change the current version of the system monitoring module 1.3, with the result that the system monitoring module 1.3 accesses the local data storage 1.5 in order to record an indication of the new version of the system monitoring module 1.3 or to update the indication of the previously stored version of the system monitoring module 1.3. This, in turn, results in the current version of system monitoring module 1.3 being used by the filtering module 1.2 operation to check actuality of the behavioral report detected among the available behavioral reports for the analyzed file, as described above in more detail.

As described above, a given log file generated by the system monitoring module 1.3 upon completion of the suitable virtual machine operation records all changes of the status parameters of the virtual machine that characterize the given suspicious file behavior in the virtual machine. Below are some examples of the status parameter changes of the running virtual machine recorded by the system monitoring module 1.3 for files with various malicious code.

Starting the suspicious file delivered to a potential victim in an electronic message, for example, in a zip archive, in the suitable virtual machine can cause, for instance, the following changes in the status parameters of the virtual machine that are detected and recorded by the system monitoring module 1.3: collection of the system information through various system calls and the registry; implementation of keylogger functions; repeated attempts to "fall asleep"; making changes in the registry; an attempt to steal passwords of an FTP client, MS Outlook, and the like through the registry; creation of a file containing results of connecting to an external server using the "HTTP POST" method; and sending data with obfuscation.

Starting the suspicious file containing, for example, malicious code like "Trojan.Generic" (disguised as a Windows update system file with subsequent theft of usernames and passwords of user applications, including browsers, email, FTP clients, and sending the collected information to the command center), in the suitable virtual machine may cause, for example, the following changes in the status parameters of the virtual machine detected and recorded by the system monitoring module 1.3: collection of data in regard to the workstation through the registry and system calls; an attempt to "fall asleep"; configuring through the registry a one-time automatic run of the installer; disabling "debugger" and tracking processes at the operating system level through the registry; attempts to connect to C&C servers and download updates.

Starting the suspicious file containing, for example, malicious code like "Trojan.Adwind" (a family of cross-platform viruses written in Java), for example, in a form of a jar archive delivered to a potential victim in an electronic message, in the suitable virtual machine may cause, for instance, the following possible changes in the status parameters of the virtual machine that are detected and registered by the system monitoring module 1.3: creation and start of VBScript scripts; creation of a temporary text file; creation of a hidden file; provisioning an autorun through the registry; hiding folder using "attrib.exe"; deleting the previously created "VBScript".

Starting the suspicious file containing, for example, malicious code like "Bartallex.InfoStealer" (a family of viruses that use macros in MS Word/Excel documents and are utilized for further loading of additional malicious code), for example, in the form of a DOC file delivered to a potential victim in an electronic message can cause, for example, the following changes in the status parameters of the virtual machine that are detected and recorded by the system monitoring module 1.3: collection of the system information through the registry and various system calls; repeated attempts to "fall asleep"; creation and start of executable files; start of "command line" commands; code injection from "eboz.exe" to "ms.exe", "winword.exe" and "explorer.exe" (an attempt to bypass the antivirus); opening one of the TCP socket ports; connection to an external server to get the configuration.

Starting the suspicious file containing, for example, malicious code of the type "Ransom.Troldesh" (a virus that is a modification of a crypto locker Trojan that may encrypt user data and later generate a message requiring payment in favour of the attacker to decrypt the data or may also be used to download additional malicious code into the compromised workstation), for instance, in the form of a TMP file delivered to a potential victim in an electronic message can cause, for example, the following changes in the status parameters of the virtual machine that are detected and recorded by the system monitoring module 1.3: collection of the system information (various system calls); scanning the running processes; changing IE settings through the registry; code injection into a copy of its own process (a method to bypass antivirus software); creating files similar to the system processes and ensuring autorun through the registry; repeated attempts to "fall asleep"; scanning the Windows processes, capturing a window; opening a TCP socket in one local port and connecting to the socket (a method to bypass antivirus software); creating a private key in the registry; creating text files in the "C" disk drive with a guide to pay the "ransom"; attempts to contact external servers by IP to get keys.

Starting the suspicious file containing, for example, malicious code of the type "Web.Exploit.Malware.Binary" (malicious code such as web exploit, after the initial compromising the workstation, injects into the process "iexplorer.exe" (Internet Explorer) and downloads parts of malicious code (HTML, JavaScript, Flash) from various web resources) that is downloaded and executed in a potential victim workstation as Flash code or JavaScipt code when a web page is loading into the workstation can cause, for example, the following changes in the status parameters of the virtual machine that are detected and recorded by the system monitoring module 1.3: code injection into the process "iexplorer.exe" (Internet Explorer); attempts to download parts of malicious code from web resources; creation of temporary executable files.

In general, the system monitoring module 1.3 may record changes of the status parameters of the running virtual machine in the following categories: file system, system registry, RAM structures including RAM regions of third-party processes, specific sequences of system calls, creation of remote connections, creation of mutexes, etc.

Depending on the computational capabilities of the server 1, the system monitoring module 1.3 may simultaneously (in real time) load multiple virtual machines to analyze in each virtual machine the behavior of a separate suspicious file.

Processing Module

In the depicted non-limiting embodiment of the server 1 of the system 10 shown in FIG. 1, the processing module 1.4 is configured to connect via the communication bus 1.6 to the system monitoring module 1.3 for receiving an indication of the log files generated and stored by the system monitoring module 1.3, as described above.

The processing module 1.4 analyzes recorded changes of the virtual machine status parameters contained in the received log files using the set of the analysis rules such that suspicious file is classified as a trusted file if the analyzed changes of the virtual machine status parameters are typical for the trusted files or as a malicious file if the analyzed changes of the virtual machine status parameters are typical for the malicious files. Thus, the processing module 1.4 renders a final determination regarding harmfulness of the suspicious file using the log file created by the system monitoring module 1.3 for the suspicious file.

In a specific non-limiting embodiment of the present technology, the processing module 1.4 operation is based on a set of pre-trained classifiers. Each classifier renders its determination regarding the harmfulness of the suspicious file using features that are retrieved using well-known algorithms from the log file. It can be said that a given classifier corresponds to at least one change of the virtual machine status parameters. As examples of classifiers that can be used, a classifier based on a linear model and a classifier based on a machine-learning algorithm (MLA), for example, on the Random Forest machine-learning algorithm are examples of classifiers in the set of the pre-trained classifiers. According to the classifier based on the linear model, each feature retrieved from the log file is assigned a weight, and then the total weight of all retrieved features is determined and the determined total weight is checked to fall into the numerical segment bounded from two sides by the threshold values or is greater or less than the threshold value that can be a constant. The classifier based on one of the MLA algorithms makes a determination regarding the harmfulness of the suspicious file based on the retrieved weighted features, as described above for the classifier based on the linear model, and other static (having no pre-determined weight) features, such as the file type and other characteristics, using an algorithm that implements the most efficient decision tree selected at the stage of training the algorithm by experts using the files that contain known malicious code (a "testing set") and are associated with clear malicious well-known behavior.

The processing module 1.4 renders the final determination regarding the suspicious file harmlessness when at least one of the set of the classifiers renders an individual determination regarding the suspicious file being harmlessness, otherwise, if no one from the set of the classifiers does not make the individual determination regarding the suspicious file being harmless, the processing module 1.4 renders the final determination regarding the suspicious file harmfulness.

In one embodiment of the present technology, the processing module 1.4 may render the final determination regarding the harmfulness of the suspicious file by comparing the total weight of the individual determinations made by the classifiers in the classifier set of the processing module 1.4 using a pre-determined threshold value that can be a constant. At the same time, while any individual determination made by each classifier is automatically assigned its own predetermined weighting factor. Thus, the processing module 1.4 generates the final determination, taking into account all individual determinations (intermediate determinations) of the used classifiers that have one or another weight in the total weight taken into account by the processing module 1.4 for the final determination.

After the final determination, the processing module 1.4 generates a separate behavioral report for each suspicious file analyzed by the processing module 1.4, and this behavioral report contains at least all the information from the corresponding log file created by the system monitoring module 1.3 for the suspicious file, in particular, the data on the behavior of the suspicious file in the corresponding virtual machine, the data on the system monitoring module 1.3 version, the data on the final verdict made by the processing module 1.4 in relation to the suspicious file, as well as the data on the classifiers used by the processing module 1.4 to make the final determination, and the personal classifier determinations on the suspicious file harmfulness or harmlessness.

The processing module 1.4 is configured to execute a framework (software platform), allowing, for example, an operator of the server 1 to make changes to the set of the classifiers used by the processing module 1.4 to make a final determination on the suspicious file harmfulness, as described above in more detail.

When the processing module 1.4 makes the final determination in regard to the suspicious file harmfulness, that is, classifies the suspicious file received from the system monitoring module 1.3 as a malicious file, the processing module 1.4 may execute at least one of the following actions: issue a warning message about the detected threat, block transmission of the malicious file to the final recipient, block the malicious file sources and/or save the created behavioral report in the behavioral reports cloud storage 4.

To store the created behavioral report, the processing module 1.4 accesses the behavioral reports cloud storage 4 for storage of the behavioral report in the behavioral reports cloud storage 4. When the behavioral report generated by the processing module 1.4 for the particular malicious file has an older or previous version of the behavioral report (that is, the version of the behavioral report created using information from the log file of the system monitoring module 1.3 of an earlier version) previously generated by the processing module 1.4 for the specified suspicious file and stored in the behavioral reports cloud storage 4, the processing module 1.4 can store both versions of specified behavior in the behavioral reports cloud storage 4, while the newly created behavioral report is assigned an identifier, label or status of the latest version of the behavioral report, as a result it is the behavioral report of the latest version that will be used in the system monitoring module 1.3 operation during the above described analysis of the next such suspicious file (that is, a file that has the same hash sum as the file there is the behavioral report for) received by the server 1.

In alternative embodiments of the present technology, when the behavioral report generated by the processing module 1.4 for the particular malicious file has an older or previous version of the behavioral report (i.e. the version of the behavioral report created using information from the log file of the system monitoring module 1.3 of an earlier version) previously generated by the processing module 1.4 for the specified suspicious file and stored in the behavioral reports cloud storage 4, the processing module 1.4 provides an update of the data in the cloud storage of 4 of the behavioral reports, deleting the previous behavioral report version and recording a new behavioral report version.

It should be noted that the communication module 1.1, the filtering module 1.2, the system monitoring module 1.3 and the processing module 1.4 implement the functions described above in fact in real time, that is, the communication module 1.1 continues to receive the network traffic, the filtering module 1.2 executes its operations to filter at least a part of the files retrieved from the previously received network traffic; the system monitoring module 1.3 executes its operations to trace behavior of at least a part of the received suspicious files, the processing module 1.4 executes its operations to analyze at least a part of the log files received from the system monitoring module 1.3, and to save at least a part of the behavioral reports created in cloud the storage 4 of the behavioral reports.

In one embodiment of the present technology, the system monitoring module 1.3 and the processing module 1.4 may be combined, for example, into a single module to analyze suspicious files that has all the above described functionalities of the system monitoring module 1.3 and the processing module 1.4.

In yet another embodiment of the present technology, the communication module 1.1 may be divided into several separate communication modules, wherein each module provides at least one of the known methods of wired and/or wireless communication in the server 1.

In some embodiments of the present technology, the system monitoring module 1.3 may be divided into several independent modules, wherein each module may execute at least one of the above described functionalities of the system monitoring module 1.3 and is configured to communicate with each other system monitoring module and with other structure modules of the server 1 via the communication bus 1.6. In this case, one of such independent modules may be configured to create a log file, as described above, or there may be, for example, an additional module to create log files that is configured to communicate with the specified independent modules, for example, via the communication bus 1.6, ensuring reception from the modules of the data on the suspicious file behavior to create the log file for the suspicious file.

In other embodiments of the present technology, the processing module 1.4 may be divided into several other independent modules, wherein each module may execute at least one of the above described functionalities of the processing module 1.4 and is configured to communicate with each other processing module and with other structure modules of the server 1 via the communication bus 1.6. In this case, one of such independent modules may be configured to create a behavioral report, as described above, or there may be, for example, an additional module to create behavioral reports that is configured to communicate with the specified independent modules, for example, via the communication bus 1.6, ensuring reception from the modules of the data on results of the received log file analysis to create the behavioral report for the particular suspicious file.

In other embodiment of the present technology, the filtering module 1.2 may be divided into several other independent modules, wherein each module may execute at least one of the above described functionalities of the filtering module 1.2 and is configured to communicate with each other filtering module and with other structure modules of the server 1 via the communication bus 1.6. At the same time, one of the independent modules may be configured to decide whether the file being analyzed should be classified as a trusted or malicious file, another one of the independent modules may be configured to decide whether the file being analyzed should be classified as a trusted file or the file being analyzed should be sent for analysis to the system monitoring module 1.3, as described above, and each of the remaining independent modules from the specified independent modules may be configured to decide whether the file being analyzed should be classified as a trusted file or sent for further analysis to another independent module from the specified independent modules. In addition, in the scope of another embodiment, there may be, for example, a separate additional decision-making module configured to communicate with each of the independent modules, for example, via the communication bus 1.6, ensuring reception from each of the modules of the data resulted due to operation of the modules, to decide whether the file being analyzed should be classified as a trusted or malicious file or sent for further analysis to another independent module of the specified independent modules or to the processing module 1.4.

In other embodiments of the present technology, each classifier from the specified set of the classifiers used in the processing module 1.4 operation may be implemented as a separate classifying module making its personal verdict regarding harmfulness or harmlessness of one or another suspicious file, wherein the individual classifying modules may be configured to communicate with the processing module 1.4, for example, via the communication bus 1.6, and the processing module 1.4 makes its final verdict regarding harmfulness or harmlessness of one or another suspicious file using a predetermined set of decision rules and personal verdicts made by the classifying modules.

According to one embodiment of the present technology, at least some of the above-described functionality of the filtering module 1.2, the system monitoring module 1.3 and/or the processing module 1.4 may be implemented as a separate functional submodule or functional unit included in the corresponding module 1.2, 1.3 and 1.4. Thus, the filtering module 1.2 may contain several submodules, wherein each submodule implements at least one of the above described functionalities of the filtering module 1.2; the system monitoring module 1.3 may contain several submodules, wherein each submodule implements at least one of the above described functionalities of the system monitoring module 1.3; and the processing module 1.4 may contain several submodules, wherein each submodule implements at least one of the above described functionalities of the processing unit 1.4.

Thus, the above described functionalities of the filtering module 1.2 provide the ability to filter most of the files retrieved from the network traffic, resulting in that the server 1 allocates comparatively smaller computational resources for the system monitoring module 1.3 to start the virtual machines to analyze behavior of the suspicious files received from the filtering module 1.2. In addition, the above-described functionalities of the system monitoring module 1.3 provide the ability to analyze behavior of the suspicious file in the virtual machine, and the above described functionalities of the processing module 1.4 provide the ability to render a determination regarding harmfulness of the suspicious file.

Figure 2:
FIG. 2 depicts a flowchart of a method executed in the system of FIG. 1, the method executable in accordance with non-limiting embodiments of the present technology.

According to another aspect, a method for detecting malicious files in the network traffic is provided, a non-limiting embodiment of which is depicted as a flowchart in FIG. 2.

The method shown in FIG. 2 begins at step 2, where the server 1 detects the malicious files in the network traffic. More specifically, at step 2.1 of the method, the network traffic from the data communication network is received via the server communication module. At step 2.2 of the method, a plurality of files from the received network traffic is retrieved, using the server filter module. At step 2.3 of the method, the retrieved files are analyzed by the server filtering module to detect at least one suspicious file from the specified file plurality. At step 2.4, a given received suspicious file is started, using the server system monitoring module, in at least one virtual machine characterized by the specified set of the status parameters. At step 2.5 of the method, changes in the specified set of the status parameters of at least one specified virtual machine are recorded, using the server system monitoring module. At step 2.6 of the method, the received changes of the status parameters are analyzed by the processing module using the specified set of the analysis rules. At step 2.7 of the method, it is determined by the processing module whether the analyzed changes of the status parameters are specific for the malicious files. If, at step 2.7 of the method, the analyzed changes of the status parameters were determined to be specific for the malicious files, then the method proceeds to step 2.8 of the method. At step 2.8, the file is classified by the processing module as a malicious file, and then the method finishes in step 2.10. Otherwise, that is, if, at step 2.7 of the method, the analyzed changes of the status parameters were not determined to be specific for the malicious files, then the method proceeds to step 2.9 of the method, and, according to the step 2.9, the running file is classified by the processing module as a trusted file, and then the method finishes in step 2.10.

The operations of step 2.1 of the method include connection, via the server communication module, to at least one of the network traffic capturing devices in the data communication network.

The operations in step 2.3 of the method include the check whether the format of each of these retrieved files is suspicious, such that the file being checked is classified as a trusted file if its format is not suspicious or as a suspicious file if its format is suspicious. At the same time, the above operation of checking format for each of the retrieved files to be suspicious comprises at least the following sub-steps: (i) identifying the format of each of the specified retrieved files, (ii) obtaining data in regard to the known malicious file formats, (iii) checking a match of the identified format of each retrieved file to one of the known malicious file formats from the specified received data. If, resulting from the operation of checking the format of each of the retrieved files to be suspicious, it was determined that the retrieved file format is suspicious, then it is determined by the server filtering module whether there is a behavioral report for the retrieved file with the suspicious format, by the following operations: getting the behavioral report data, calculating the hash sum of each retrieved file and determining match of each extracted file to one of the available behavioral reports, by comparing the calculated hash sum of the extracted file with the hash sums that identify the behavioral reports in the specified obtained data.

In response to the fact that there is the behavioral report for the retrieved file with the suspicious format, the server filtering module is additionally used to check whether the existing behavioral report is up-to-date, such that the extracted file is classified as a trusted file or as a malicious file if it is classifies as such file in the up-to-date behavioral report. In this case, in response to the fact that the existing behavioral report is not up-to-date, the filtering module 1.2 is used to check whether the analyzed file is signed with the trusted electronic signature, ensuring that the file being checked is classified as a trusted file if it is signed with the trusted electronic signature.

According to the non-limiting embodiments of the method, the step of checking whether the retrieved file has the trusted electronic digital signature may include execution at least of the following sub-stages: (i) identifying the owner of the electronic signature that was used to sign the extracted file, (ii) receiving indication of the trusted owners of the electronic signatures, (iii) checking a match of the electronic signature identified owner from the specified received data with one of the trusted owners of electronic signatures. According to the non-limiting embodiments of the method, in response to the fact that the extracted file is not signed with the trusted electronic signature, the server filtering module is used to check whether the specified file is received from the trusted data source, ensuring that the file being checked is classified as a trusted file if it was originated from the trusted data source.

According to the non-limiting embodiments of the method, the step of checking origination of the retrieved file includes execution at least of the following sub-stages: (i) determining the extracted file source, (ii) receiving the data indicative of the trusted sources, (iii) determining from the received data whether the particular source of the analyzed file origin matches to one of the trusted data sources. According to the non-limiting embodiments of the method, in response to the fact that the retrieved file does not originate from the trusted data source, the server filtering module is used to check whether the trusted file identifier is assigned to the specified file, ensuring that the file being checked is classified as a trusted file if it was assigned the trusted file identifier.

According to the non-limiting embodiments of the method, the step of checking whether the retrieved file has the trusted file identifier includes execution at least of the following sub-stages: (i) calculating the hash sum of the received file, (ii) receiving the data indicative of the trusted files, each of which is associated with a particular hash sum, (iii) determining whether the calculated hash sum of the analyzed file matches to the hash sum of one of the trusted files of the specified received data. According to the non-limiting embodiments of the method, in response to the fact that the received file has no trusted file identifier, the server filtering module is used to send the extracted file to the system monitoring module.

The operations at step 2.4 of the method include execution at least of the following sub-steps: (i) identifying at least one attribute of each suspicious file received, (ii) obtaining data representative of existing virtual machines, each of which is characterized by a given set of configuration attributes, (iii) identifying the existing virtual machine from the received data of the default virtual machine, where at least one configuration attribute from the specified set of the configuration attributes matches the specified identified attribute of the suspicious file, (iv) running the suspicious file in the detected default virtual machine with identification of at least one more attribute of the running file and check whether the specified one more identified attribute matches at least one more of the specified configuration attributes of the default virtual machine, (v) if at least one and identified more attribute of the running file does not match at least one configuration attribute of the default virtual machine, restarting the suspicious file in another virtual machine from the plurality of the existing virtual machines, wherein the configuration attributes coincide with the specified attributes of the suspicious file.

According to the non-limiting embodiments of the method, for the stage of recording changes in the specified set of the status parameters of at least one virtual machine, the system monitoring module is used to trace the specified changes during the predetermined time period of 2-3 minutes. In the non-limiting embodiments of the method, the server system monitoring module is further configured to change the specified set of the status parameters of each virtual machine and/or to change the specified set of the analysis rules.

In response to classifying the file analyzed in the server processing module as a malicious file, according to the non-limiting embodiments of the method, the server processing module may be used to issue an alert message, to block the malicious file, to block the malicious file sources, to add the malicious file into the malicious file database and/or to create the behavioral report for the malicious file. In the non-limiting embodiments of the method, each of the specified virtual machines is additionally configured by installing an operating system of the required architecture, choosing the operating system locale language, installing the necessary software and/or configuring the installed software.

According to yet another aspect of the present technology, a computer-readable medium for long-term data storing is proposed that stores computer-readable instructions that, when executed by the server processor, cause execution of the method stages described herein. The computer-readable instructions may contain a computer-readable program code that can be transmitted using any suitable communication medium, including wireless communication, wired communication, fiber optic cable, radio frequency and/or similar techniques, and/or any their suitable combination. The computer-readable program code may be written using one of programming languages or any combination of programming languages that may contain as an object-oriented programming language, such as "Java", "Smalltalk", "C++", and/or the similar languages, and usual procedural programming languages such as the programming language C. The computer-readable program code may be fully or partially executed in the server 1.

Thus, the computer-readable software instructions stored in the computer-readable medium may provide control of the server 1 in such a way that the server 1 will operate as described above, so that the computer-readable instructions stored in the computer-readable medium create an industrial product containing the software instructions implementing the functions/actions specified in the blocks of the flowchart of FIG. 2 that shows the server 1 operation.

As a computer-readable medium for long-term storing of the data, one of the following physical computer-readable media designed to store data for a long time period may be used: hard disk drives, read-only memory (ROM), compact disc drives (CD), universal digital disc drives (DVD), floppy disk drives, Blu-ray disk drives, etc.

Modifications and improvements to the above described embodiments of this technical solution will be clear to those skilled in the art. The foregoing description is provided as an example only and is not limited in any way. Thus, the scope of this technical solution is limited only by the scope of the attached claims.

The invention claimed is:

1. A server for determining malicious files in a network traffic of a data communication network, the server including:
 a processor communicatively coupled to the data communication network; and
 a non-transitory computer-readable medium storing instructions,
 the processor, upon executing the instructions, being configured to:
  receive, from the data communication network, the network traffic;
  retrieve a plurality of files from the network traffic;
  analyze the plurality of files in order to detect at least one suspicious file by checking whether a format of a given one of the plurality of files matches a known suspicious format;
  in response to identifying that the given one of the plurality of files is associated with a suspicious file format, determine whether there is a behavioral report associated with the given one of the plurality of files;
  if the behavioral report exists, analyze the behavioral report to determine presence therein of data indicative of the given one of the plurality of files being a suspicious file,
  in response to the analyzing rendering a positive result, identify the given one of the plurality of files as being the at least one suspicious file;
  run the at least one suspicious file in at least one virtual machine, the at least one virtual machine being associated with a set of status parameters;
  determine changes in the set of the status parameters of the at least of one specified virtual machine;

receive the changes in the set of the status parameters; and analyze the changes in the set of the status parameters using a set of analysis rules such that to classify the at least one suspicious file as a malicious file based on the changes in the set of the status parameters being indicative of the at least one file being the malicious file.

2. The server of claim 1, wherein the processor is further configured to connect to at least one of network traffic capturing devices that are part of the data communication network.

3. The server of claim 1, wherein the processor is further configured to classify the given one of the plurality of files as one of (i) a trusted file if its format does not match the known suspicious file format and (ii) as a suspicious file if its format matches the known suspicious format.

4. The server of claim 3, wherein, when checking the format of the given one of the plurality of files, the processor is configured to:

identify the format of the given one of the plurality of files;

receive an indication of known harmful file formats; and determine a match of the format of the given one of the plurality of files and each of the known harmful file formats.

5. The server of claim 4, wherein, if the behavioral report exists, to analyze the behavioral report, the processor is further configured to execute:

receive an indication of the behavioral report; and generate a hash sum of the given one of the plurality of files, wherein to determine the match, the processor is configured to compare the hash sum of the given one of the plurality of files with hash sums that identify the behavioral reports.

6. The server of claim 1, wherein, if the behavioral report exists, the processor is further configured to check whether the existing behavioral report is up-to-date such that the classification of the given one of the plurality of files is executed in response to the existing behavioral report being up-to-date.

7. The server of claim 6, wherein, in response to the fact that the existing behavioral report is not up-to-date, the processor is further configured to check whether the given one of the plurality of files is signed with a trusted electronic signature such that the given one of the plurality of files is classified as the trusted file if it is signed with the trusted electronic signature.

8. The server of claim 7, wherein, when checking whether the given one of the plurality of files signed with the trusted electronic signature, the processor is configured to:

identify an electronic signature owner who signed the given one of the plurality of files;

receive an indication of trusted owners of the electronic signatures; and determine a match of the electronic signature owner with the trusted owners of electronic signatures.

9. The server of claim 7, wherein, in response to the fact that the given one of the plurality of files is not signed with the trusted electronic signature, the processor is further configured to check whether the given one of the plurality of files originates from a trusted data source such that the given one of the plurality of files is classified as the trusted file if it originated from the trusted data source.

10. The server of claim 9, wherein, in order to check if the given one of the plurality of files originates from the trusted data source, the processor is configured to:

determine a source of the given one of the plurality of files;

receive data indicative of trusted sources; and determine, based on the data indicative of trusted sources, a match of the source of the given one of the plurality of files with the trusted sources.

11. The server of claim 9, wherein, in response to the fact that the given one of the plurality of files does not originate from the trusted source, the processor is further configured to check whether a trusted file identifier has been assigned to the given one of the plurality of files such that the given one of the plurality of files is classified as the trusted file if it was assigned the trusted file identifier.

12. The server of claim 11, wherein, in order to check whether the given one of the plurality of files has the trusted file identifier, the processor is configured to:

generate a hash sum of the given one of the plurality of files;

receive data representative of trusted files, each of the trusted files having a respective trusted file hash sum; and determine a match of the hash sum of the given one of the plurality of files with one of respective trusted file hash sums.

13. The server of claim 12, wherein, in response to the fact that the given one of the plurality of files has no trusted file identifier, the processor is further configured to send the given one of the plurality of files to the at least one virtual machine.

14. The server of claim 1, wherein, to run each of the at least one suspicious file in the virtual machine, the processor is further configured to:

identify at least one attribute of each of the at least one suspicious received file;

receive data representative of available virtual machines, wherein each of the available virtual machines is associated with a set of configuration attributes;

determine a default virtual machine from the available virtual machines, based on at least one configuration attribute of the set of the configuration attributes matching with the at least one attribute of a given one of the at least one suspicious file;

start the given one of the at least one suspicious file in the default virtual machine such that at least one additional attribute of the given one of the at least one suspicious file is identified;

determine a match of the at least one additional attribute with at least one additional configuration attribute of the default virtual machine; and in response to a negative outcome of the match, restart execution of the given one of the at least one suspicious file in yet another virtual machine from the existing virtual machines, wherein the configuration attributes of the other existing virtual machine match with the attributes of the given one of the at least one suspicious file.

15. The server of claim 1, wherein, to determine changes in the set of the status parameters of at least one specified virtual machine, the processor is configured to trace the changes over a pre-predetermined time period of 2 to 3 minutes.

16. The server of claim 15, wherein the processor is further configured to change at least one of: the set of the status parameters of each virtual machine and the set of the analysis rules.

17. The server of claim 1, wherein, in response to classifying the at least one suspicious file as the malicious file, the processor is further configured to execute one of: issuing an alert message, blocking the malicious file, blocking a source associated with the malicious file, adding the malicious file into a malicious file database, generating a behavioral report for the malicious file.

18. A computer-implemented method for determining malicious files in a network traffic of a data communication network, the method executable by a server including a processor communicatively coupled to the data communication network; the method comprising:
   receiving the network traffic from the data communication network, retrieving a plurality of files from the network traffic;
   analyzing the plurality of files in order to detect at least one suspicious file by checking whether a format of a given one of the plurality of files matches a known suspicious format;
   in response to identifying that the given one of the plurality of files is associated with a suspicious file format, determining whether there is a behavioral report associated with the given one of the plurality of files;
   if the behavioral report exists, analyzing the behavioral report to determine presence therein of data indicative of the given one of the plurality of files being a suspicious file;
   in response to the analyzing rendering a positive result, identifying the given one of the plurality of files as being the at least one suspicious file;
   running the at least one suspicious file in at least one virtual machine, the at least one virtual machine being associated with a set of status parameters;
   determining changes in the set of the status parameters of the at least of one specified virtual machine; and
   analyzing the changes in the set of the status parameters using a set of analysis rules such that to classify the at least one suspicious file as a malicious file based on the changes in the set of the status parameters being indicative of the at least one file being the malicious file.

19. The method of claim 18, wherein the checking the format of the given one of the plurality of files comprises:
   identifying the format of the given one of the plurality of files;
   receiving an indication of known harmful file formats; and
   determining a match of the format of the given one of the plurality of files and each of the known harmful file formats.

* * * * *